United States Patent Office 2,880,193
Patented Mar. 31, 1959

2,880,193

COMPOSITION COMPRISING CHLORINATED ETHYLENICALLY UNSATURATED LINEAR POLYESTER AND MIXTURE OF MONOMERS COPOLYMERIZABLE THEREWITH

Henry P. Marshall, New Providence, and Richard E. Davies, Ridgewood, N.J., assignors to Celanese Corporation of America, New York, N.Y., a corporation of Delaware No Drawing. Application September 7, 1955
Serial No. 533,016

7 Claims. (Cl. 260—45.4)

This invention relates to polyester resins and relates more particularly to fire-resistant polyester resins of improved light stability.

As is well known, polyester resins are prepared by copolymerizing an ethylenically unsaturated linear polyester with an ethylenically unsaturated monomer. These resins, in combination with glass fibers, are widely used for the preparation of skylights, permanent awnings and in many other areas of the building and allied fields. The use of these materials is considerably restricted because of the flammability of the glass fiber-polyester resin combination. To improve the fire resistance of the said combination, it has been proposed to prepare the said resins from chlorinated polyesters. However, these chlorinated polyester resins have a poor stability to light and are subject to extreme discoloration when exposed to ultraviolet light so that they become unsightly in a comparatively short period of time when employed in locations where the rays of the sun can strike them. It is possible to achieve some improvement in the light stability of the chlorinated polyester resins by incorporating therein agents that absorb ultra-violet light, but the amount of the improvement is not sufficient to prevent the discoloration of the resin to such an extent as to render it unfit for commercial use.

It is an important object of this invention to provide a polyester resin which will be free from the foregoing and other difficulties.

A further object of this invention is to provide a fire-resistant polyester resin of good light stability.

Other objects of this invention will be apparent from the following detailed description and claims.

According to the present invention, there is provided a fire-resistant polyester resin by copolymerizing with a chlorinated polyester a mixture of ethylenically unsaturated monomers, one of said monomers being an ethylenically unsaturated hydrocarbon and the other of said monomers being an ethylenically unsaturated ester. Polyester resins prepared in this manner are highly fire-resistant and, in addition, show good light stability. As a result, these polyester resins are well suited for widespread commercial use.

The chlorinated, ethylenically unsaturated linear polyester that is employed in preparing the resin of this invention may be made by reacting an ethylenically unsaturated polycarboxylic acid, preferably a dicarboxylic acid, with a polyhydric alcohol, preferably a dihydric alcohol. As is well known in the art, there may also be present during the reaction a polycarboxylic acid, preferably a dicarboxylic acid, that does not contain any ethylenic unsaturation. Any one or more of the reactants may have substituted thereon one or more chlorine atoms. Generally, in order to obtain good fire resistance, the number of chlorine atoms should be such as to give the final polyester resin a chlorine content of at least about 25% by weight, or, preferably, at least about 28% by weight. However, in some cases polyester resins having a lower chlorine content may be suitable. In the latter instance, a small proportion of a suitable fire retardant may be incorporated in the resin to improve the fire resistance thereof.

Examples of suitable ethylenically unsaturated polycarboxylic acids that may be employed in preparing the polyester are the $\alpha,\beta$-ethylenically unsaturated dibasic acids, such as maleic acid, fumaric acid, itaconic acid and the like. Also the chlorine substituted derivatives of such acids, such as, for example, chloromaleic acid. Examples of suitable polycarboxylic acids that are not ethylenically unsaturated are phthalic acid, adipic acid and azelaic acid. Also the chlorine substituted derivatives of such acids, such as, for example, tetrachlorophthalic acid. Another acid that may be used is "chlorendic" acid which is the adduct of maleic acid and hexachlorocyclopentadiene. Generally, these acids are employed in the form of their anhydrides. The polycarboxylic acids are reacted with polyhydric alcohols, such as, for example, ethylene glycol, propylene glycol and diethylene glycol. The preparation of these polyesters is well known in the art.

The chlorinated polyesters are copolymerized with a mixture of monomers. One of said monomers is an ethylenically unsaturated hydrocarbon and is preferably an aromatic hydrocarbon having an ethylenically unsaturated side chain linked thereto; for example, styrene, $\alpha$-methyl styrene, divinyl benzene, vinyl toluene, vinyl naphthalene and acenaphthylene. The other monomer is an ethylenically unsaturated ester and is preferable an ethylenically unsaturated lower aliphatic ester, such as, for example, methyl methacrylate, ethyl methacrylate, diethyl fumarate, ethyl acrylate, methyl acrylate and dimethyl itaconate. The amount of the ethylenically unsaturated ester should be between about 25 and 75% on a molar basis of the total amount of monomer. When diethyl fumarate is used as one of the monomers, there must also be present an equimolecular proportion of another monomer to bring about polymerization. The total amount of monomers may advantageously be between about 30 and 35% by weight of the amount of the polyester plus monomer. The monomers may be mixed with the polyester and the copolymerization thereof effected by the use of heat, a catalyst, or both, all as well known in the art.

While the polyester resins of this invention show a good light stability without the use of ultraviolet light absorbing agents, the use of such agents to achieve an even better light stability may be desirable in certain cases. Other materials capable of modifying the appearance or properties of the final products may also be incorporated into the polyester resin composition.

The following examples are given to illustrate this invention further:

*Example I*

A chlorinated polyester is prepared by heating together a mixture of equal moles of maleic anhydride and chlorendic anhydride with an equimolecular proportion of propylene glycol until a polyester having an acid number of about 20 is obtained. Then, 70 parts by weight of the polyester are mixed with 20 parts by weight of styrene and 10 parts by weight of diethyl fumarate as comonomers, and there is added to the mixture 2 parts by weight of equal parts by weight of benzoyl peroxide and tricresyl phosphate as a catalyst. A casting is prepared from the mixture by heating the same for 16 hours at 55° C., 0.5 hour at 70° C., 0.5 hour at 90° C. and for one hour at 120° C. The casting is exposed to intense ultra-violet light for 215 hours by holding the same at a distance of 4 inches from a 275 watt General Electric sun lamp. The original percent light transmission of the sample at a wave length of 440 mu is 86.2 and after exposure 64.0.

When the polyester resin is prepared using 30 parts by weight of styrene as the sole comonomer, the percent transmission before exposure is 84.2. After 215 hours exposure, the percent transmission is 54.0.

Example II

There is mixed with 70 parts by weight of the polyester of Example I, 10 parts by weight of styrene and 20 parts by weight of ethyl acrylate, and there is added to the mixture 2 parts by weight of the catalyst specified in Example I. The polyester resin is cast in the manner described in Example I. The percent transmission of the resin as cast is 79. After exposure to ultra-violet light in the manner set out in Example I for 215 hours, the percent transmission is 63.

Example III

A series of polyesters is prepared in the manner described in Example I, employing different mixtures of comonomers. The results obtained are as follows:

| Monomer | Percent | Percent Styrene | Transmission at 440 mu-Percent Hours Exposure | | |
|---|---|---|---|---|---|
| | | | 0 | 120 | 215 |
| Diethyl Fumarate | 15 | 15 | 84.9 | 72.5 | 71.0 |
| Do | 20 | 10 | 85.0 | 77.0 | 75.0 |
| Methyl Methacrylate | 20 | 10 | 84.3 | 60.5 | 58.9 |
| Do | 15 | 15 | 83.9 | 61.0 | 60.0 |

It is to be understood that the foregoing detailed description is merely given by way of illustration and that many variations may be made therein without departing from the spirit of our invention.

Having described our invention, what we desire to secure by Letters Patent is:

1. A composition of matter comprising a chlorinated ethylenically unsaturated linear polyester of a dihydric alcohol and a dicarboxylic acid component containing chlorine and ethylenic unsaturation, and a mixture of monomers copolymerizable with said polyester comprising an aromatic hydrocarbon selected from the group consisting of styrene, 2-methyl styrene, divinyl benzene, vinyl toluene, vinyl naphthalene and acenaphthylene, and an ethylenically unsaturated lower aliphatic ester, the proportion of ester on a molar basis being between about 25 and 75 percent of the total monomer, the proportion of chlorine in the polyester being such that the final resin will contain at least 25 percent by weight of chlorine.

2. A polyester resin produced by polymerizing the composition of matter of claim 1.

3. A composition of matter as set forth in claim 1 in which the total monomer comprises 30% of the weight of the polyester plus monomer.

4. A composition of matter comprising a chlorinated ethylenically unsaturated linear polyester of a dihydric alcohol and a dicarboxylic acid component containing chlorine and ethylenic unsaturation, and a mixture of monomers copolymerizable with said polyester comprising styrene and an ethylenically unsaturated lower aliphatic ester, the proportion of ester on a molar basis being between about 25 and 75 percent of the total monomer, the proportion of chlorine in the polyester being such that the final resin will contain at least 25 percent by weight of chlorine, and the mixture of monomers constituting about 30 to 35 percent by weight of the polyester plus monomers.

5. A composition of matter comprising a chlorinated ethylenically unsaturated linear polyester of a dihydric alcohol and a chlorinated ethylenically unsaturated dicarboxylic acid, and a mixture of monomers copolymerizable with said polyester comprising styrene and an ethylenically unsaturated lower aliphatic ester, the proportion of ester on a molar basis being between about 25 and 75 percent of the total monomer, the proportion of chlorine in the polyester being such that the final resin will contain at least 25 percent by weight of chlorine.

6. A composition of matter comprising a chlorinated ethylenically unsaturated linear polyester of a dihydric alcohol and a chlorinated ethylenically unsaturated dicarboxylic acid, and a mixture of monomers copolymerizable with said polyester comprising styrene and diethyl fumarate, the proportion of diethyl fumarate on a molar basis being between about 25 and 75 percent of the total monomer, the proportion of chlorine in the polyester being such that the final resin will contain at least 25 percent by weight of chlorine, and the mixture of monomers constituting about 30 to 35 percent by weight of the polyester plus monomers.

7. A composition of matter comprising a chlorinated ethylenically unsaturated linear polyester of a dihydric alcohol and a chlorinated ethylenically unsaturated dicarboxylic acid, and a mixture of monomers copolymerizable with said polyester comprising styrene and diethyl fumarate, there being present for each 70 parts by weight of polyester 20 parts by weight of styrene and 10 parts by weight of diethyl fumarate, the proportion of chlorine in the polyester being such that the final resin will contain at least 25 percent by weight of chlorine.

References Cited in the file of this patent

UNITED STATES PATENTS

| | | |
|---|---|---|
| 2,319,799 | D'Alelio | May 25, 1943 |
| 2,779,701 | Robitschek et al. | Jan. 29, 1957 |

FOREIGN PATENTS

| | | |
|---|---|---|
| 540,169 | Great Britain | Oct. 8, 1941 |